(12) United States Patent
Wei et al.

(10) Patent No.: US 11,038,700 B2
(45) Date of Patent: *Jun. 15, 2021

(54) DISTRIBUTED KEY MANAGEMENT FOR TRUSTED EXECUTION ENVIRONMENTS

(71) Applicant: Advanced New Technologies Co., Ltd., Grand Cayman (KY)

(72) Inventors: Changzheng Wei, Hangzhou (CN); Ying Yan, Hangzhou (CN); Boran Zhao, Hangzhou (CN); Xuyang Song, Hangzhou (CN)

(73) Assignee: Advanced New Technologies Co., Ltd., George Town (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/893,122

(22) Filed: Jun. 4, 2020

(65) Prior Publication Data

US 2020/0304319 A1 Sep. 24, 2020

Related U.S. Application Data

(63) Continuation of application No. 16/671,024, filed on Oct. 31, 2019, now Pat. No. 10,715,339, which is a
(Continued)

(51) Int. Cl.
*H04L 9/32* (2006.01)
*H04L 9/06* (2006.01)
(Continued)

(52) U.S. Cl.
CPC .......... *H04L 9/3273* (2013.01); *H04L 9/0637* (2013.01); *H04L 9/0819* (2013.01);
(Continued)

(58) Field of Classification Search
CPC ... H04L 9/3273; H04L 9/0637; H04L 9/0819; H04L 9/0894; H04L 9/14; H04L 9/321;
(Continued)

(56) References Cited

U.S. PATENT DOCUMENTS 10,063,529 B2  8/2018 Milazzo et al.
10,270,770 B1  4/2019 Irwan
(Continued)

FOREIGN PATENT DOCUMENTS

CN  107342858  11/2017
WO  WO 2018189657  10/2018
(Continued)

OTHER PUBLICATIONS

Behl et al., "Hybrids on Steroids: SGX-Based High Performance BFT," Apr. 2017, EuroSys '17:Proceedings of the Twelfth European Conference on Computer Systems, pp. 222-237.
(Continued)

*Primary Examiner* — Darren B Schwartz
(74) *Attorney, Agent, or Firm* — Fish & Richardson P.C.

(57) ABSTRACT

Disclosed herein are methods, systems, and apparatus, for securely executing smart contract operations in a trusted execution environment (TEE). One of the methods includes establishing, by a key management (KM) TEE of a KM node, a trust relationship with a plurality of KM TEEs in a plurality of KM nodes based on performing mutual attestations with the plurality of KM TEEs; initiating a consensus process with the plurality of KM TEEs for reaching consensus on providing one or more encryption keys to a service TEE of the KM node; in response to reaching the consensus with the plurality of KM TEEs, initiating a local attestation process with a service TEE in the KM node; determining that the local attestation process is successful; and in response to determining that the local attestation process is successful, providing one or more encryption keys to the TEE executing on the computing device.

20 Claims, 8 Drawing Sheets

Related U.S. Application Data continuation of application No. PCT/CN2019/084530, filed on Apr. 26, 2019.

(51) Int. Cl.
| | |
|---|---|
| H04L 9/08 | (2006.01) |
| H04L 9/14 | (2006.01) |
| G06F 21/62 | (2013.01) |
| G06F 21/53 | (2013.01) |

(52) U.S. Cl.
CPC .............. *H04L 9/0894* (2013.01); *H04L 9/14* (2013.01); *H04L 9/321* (2013.01); *H04L 2209/38* (2013.01)

(58) Field of Classification Search
CPC ... H04L 2209/38; H04L 63/123; H04L 63/06; H04L 2209/127; H04L 9/3239; H04L 9/0861; G06F 21/6218; G06F 21/53
See application file for complete search history.

(56) References Cited

U.S. PATENT DOCUMENTS

| | | | |
|---|---|---|---|
| 10,541,804 | B2 | 1/2020 | Bowman et al. |
| 2014/0096182 | A1 | 4/2014 | Smith |
| 2016/0036826 | A1 | 2/2016 | Pogorelik et al. |
| 2016/0065376 | A1 | 3/2016 | Smith et al. |
| 2017/0111175 | A1 | 4/2017 | Oberhauser et al. |
| 2017/0323392 | A1 | 11/2017 | Kasper et al. |
| 2017/0352012 | A1 | 12/2017 | Hearn et al. |
| 2017/0352027 | A1* | 12/2017 | Zhang ................ G06Q 20/3678 |
| 2018/0039667 | A1* | 2/2018 | Pierce ................. G06F 16/2379 |
| 2018/0041946 | A1 | 2/2018 | Park et al. |
| 2018/0167393 | A1 | 6/2018 | Walrant |
| 2018/0183586 | A1 | 6/2018 | Bhargav-Spantzel et al. |
| 2018/0183603 | A1 | 6/2018 | Liu et al. |
| 2018/0212770 | A1 | 7/2018 | Costa |
| 2018/0225448 | A1 | 8/2018 | Russ Tovich et al. |
| 2018/0227275 | A1 | 8/2018 | Russinovich et al. |
| 2018/0239897 | A1 | 8/2018 | Ventura |
| 2018/0247063 | A1 | 8/2018 | Li |
| 2018/0287802 | A1* | 10/2018 | Brickell ................ H04L 9/3263 |
| 2018/0309567 | A1 | 10/2018 | Wooden |
| 2018/0337771 | A1 | 11/2018 | Baker et al. |
| 2019/0026234 | A1 | 1/2019 | Harnik et al. |
| 2019/0035018 | A1 | 1/2019 | Nolan et al. |
| 2019/0036957 | A1* | 1/2019 | Smith ................... H04L 63/101 |
| 2019/0044927 | A1 | 2/2019 | Sood et al. |
| 2019/0058696 | A1* | 2/2019 | Bowman .............. H04L 9/3236 |
| 2019/0068380 | A1* | 2/2019 | Tang ..................... H04L 9/3265 |
| 2019/0081800 | A1 | 3/2019 | Uhr et al. |
| 2019/0095879 | A1 | 3/2019 | Eyal et al. |
| 2019/0132136 | A1* | 5/2019 | Scarlata ................ G06F 9/3877 |
| 2019/0140836 | A1* | 5/2019 | Novak .................. H04L 63/061 |
| 2019/0140846 | A1 | 5/2019 | Moore et al. |
| 2019/0156301 | A1* | 5/2019 | Bentov ................ G06Q 20/389 |
| 2019/0158275 | A1* | 5/2019 | Beck .................... G06F 16/2379 |
| 2019/0220603 | A1* | 7/2019 | Gopalakrishnan ...... G06F 21/74 |
| 2019/0222575 | A1 | 7/2019 | Oberhauser et al. |
| 2019/0243963 | A1* | 8/2019 | Soriente ................ H04L 9/0844 |
| 2019/0312734 | A1 | 10/2019 | Wentz et al. |
| 2019/0317924 | A1 | 10/2019 | Alimi et al. |
| 2020/0067907 | A1* | 2/2020 | Avetisov ............... H04L 9/3218 |
| 2020/0117825 | A1* | 4/2020 | Vaswani ............. G06F 16/2455 |
| 2020/0145231 | A1* | 5/2020 | Trevethan ............. H04L 9/3239 |
| 2020/0211003 | A1* | 7/2020 | Fletcher ............. G06Q 20/3829 |
| 2020/0228318 | A1* | 7/2020 | Karame ................. G06F 21/57 |

FOREIGN PATENT DOCUMENTS

| | | |
|---|---|---|
| WO | WO 2019016641 | 1/2019 |
| WO | WO 2019072263 | 4/2019 |
| WO | WO 2019072281 | 4/2019 |
| WO | WO 2019072297 | 4/2019 |

OTHER PUBLICATIONS

Brandenburger et al., "Blockchain and trusted computing: Problems, pitfalls, and a solution for hyperledger fabric." arXiv preprint arXiv:1805.08541, 2018, 13 pages.

Cheng et al., "Ekiden: A Platform for Confidentiality—Preserving, Trustworthy, and Performant Smart Contract," 2019 IEEE European Symposium on Security and Privacy, Jun. 2019, pp. 185-200.

Crosby et al., "BlockChain Technology: Beyond Bitcoin" Sutardja Center for Entrepreneurship & Technology Technical Report, Oct. 16, 2015, 35 pages.

Dash.org [online], "Your money, your way," 2019 retrieved on Sep. 30, 2018, retrieved from URL<https://www.dash.org/>, 4 pages.

Extended European Search Report in European Application No. 19739185.7, dated Mar. 26, 2020, 5 pags.

Github.com [online], "Coco-framework," May 2, 2019, retrieved on Sep. 30, 2018, retrieved from URL<https://github.com/Azure/coco-framework>, 2 pages.

Github.com [online], "Private-data-objects," Dec. 17, 2019, retrieved on Dec. 31, 2019, retrieved from URL<https://github.com/hyperledger-labs/private-data-objects>, 2 pages.

Github.com [online], "Quorum," Dec. 20, 2019, retrieved on Sep. 30, 2018, retrieved from URL<https://github.com/jpmorganchase/quorum>, 6 pages.

Kosba et al., "The blockehain model of cryptography and privacy-preserving smart contracts," 2016 IEEE Symposium on Security and Privacy (SP), Aug. 2016, pp. 839-858.

Lee, "BIDaaS: Blockchain based ID as a service," IEEE Access, 2017, 6:2274-2278.

Lind et al., "Teechan: Payment Channels Using Trusted Execution Environments," arXiv preprint arXiv:1612.07766, Dec. 2016, 16 pages.

Microsoft, "The Coco Framework Technical Overview," Aug. 10, 2017, retrieved on Dec. 31, 2019, retrieved from URL<https://github.com/wooriapt/Coco-Framework-whitepaper/blob/master/Coco%20Framework%20whitepaper.pdf>, 27 pages.

Monero [online], "Private Digital Currency," 2019 retrieved on Sep. 30, 2018, retrieved from URL<https://web.getmonero.org/>, 5 pages.

Nakamoto, "Bitcoin: A Peer-to-Peer Electronic Cash System," www.bitcoin.org, 2005, 9 pages.

PCT International Search Report and Written Opinion in International Application No. PCT/CN2019/084530, dated Jan. 31, 2020, 6 pages.

Weiser et at, "SGXIO: Generic Trusted I/O Path for Intel SGX," CODAPSY '17: Proceedings of the Seventh ACM on Conference on Data and Application Security and Privacy, Mar. 2017, pp. 261-268.

Wikipedia.org [online], "Trusted execution environment," Dec. 23. 2019, retrieved on Dec. 31, 2019, retrieved from URL<https://en.wikipedia.org/wiki/Trusted_execution_environment>, 8 pages.

Z.cash [online], "Zcash," 2019, retrieved on Sep. 30, 2018, retrieved from URL<https://z.cash/>, 3 pages.

Zhou et al., "Cssp: The consortium blockchain model for improving the trustworthiness of network software services," IEEE International Symposium on Parallel and Distributed Processing with Applications and 2017 IEEE International Conference on Ubiquitous Computing and Communications, Dec. 2017, pp. 101-107.

* cited by examiner

DISTRIBUTED KEY MANAGEMENT FOR TRUSTED EXECUTION ENVIRONMENTS

CROSS-REFERENCE TO RELATED APPLICATIONS

This application is a continuation of and claims the benefit of priority to U.S. patent application Ser. No. 16/671,024, filed Oct. 31, 2019, which is a continuation of PCT Application No. PCT/CN2019/084530, filed on Apr. 26, 2019, which are hereby incorporated by reference in their entirety.

TECHNICAL FIELD

This specification relates to trusted execution environments.

BACKGROUND

Distributed ledger systems (DLSs), which can also be referred to as consensus networks, and/or blockchain networks, enable participating entities to securely, and immutably store data. DLSs are commonly referred to as blockchain networks without referencing any particular use case. An example of a type of blockchain network can include consortium blockchain networks provided for a select group of entities, which control the consensus process, and includes an access control layer.

A trusted execution environment (TEE) is an isolated and secure area of a microprocessor that guarantees that software instructions and data executing or stored within the microprocessor have not been compromised or altered. Applications executed inside the TEE are verified by a trusted authority (e.g., the manufacture of the microprocessor), and issued encryption keys upon verification to allow communication between the application and other nodes and trusted applications. These encryption keys can be issued by a centralized key management system (KMS) which facilitates the verification of the application with the trusted authority (also referred to as "attestation").

One potential issue with a centralized KMS is the introduction of a single point of failure. An outage in the centralized KMS can prevent applications executing in TEEs from being verified until it is resolved. Further, an attacker may be able to compromise the system as a whole by gaining control of the centralized KMS. A secure, distributed system functioning as a KMS would thus be desirable.

SUMMARY

This specification describes technologies for implementing a distributed key management system including a set of key management (KM) nodes. The KM nodes each execute key management applications inside TEEs, and each perform a mutual attestation process with one or more of the other KM nodes based on a mutual attestation logic to establish trust relationships connecting all KM nodes in the set. Once this trust is established, the KM nodes can reach consensus to assign encryption keys to one or more service TEEs for securely execute one or more smart contract operations in a trusted environment.

This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
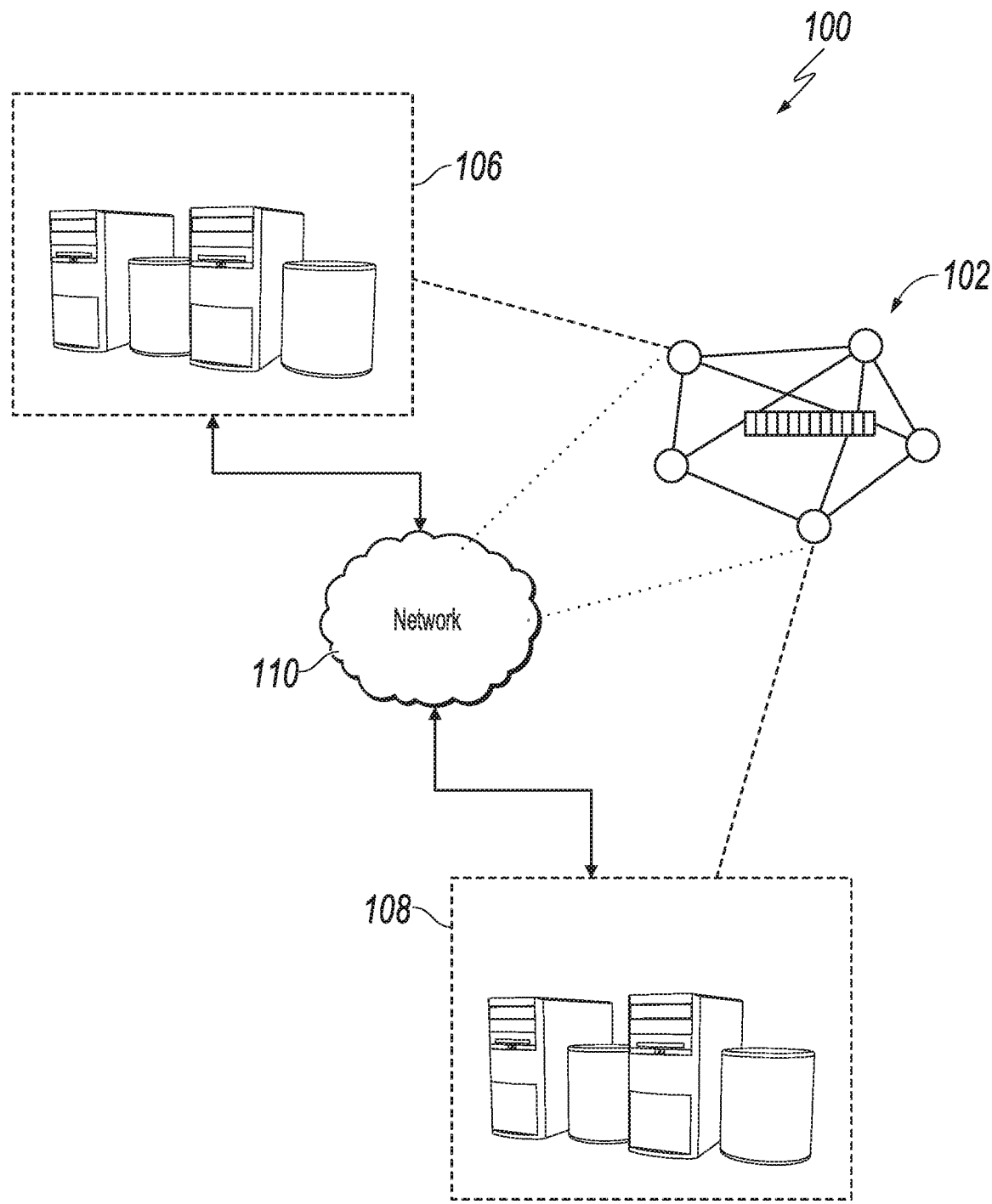
FIG. 1 is a diagram illustrating an example of an environment that can be used to execute embodiments of this specification.

This specification describes technologies for implementing a distributed key management system including a set of key management (KM) nodes. The KM nodes each execute key management applications inside TEEs, and each perform a mutual attestation process with one or more of the other KM nodes based on a mutual attestation logic to establish trust relationships connecting all KM nodes in the set. Once this trust is established, the KM nodes can reach consensus to assign encryption keys to one or more service TEEs for securely execute one or more smart contract operations in a trusted environment.

To provide further context for embodiments of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. It is contemplated, however, that embodiments of this specification can be realized in any appropriate type of blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus, described in further detail below.

FIG. 1 is a diagram illustrating an example of an environment 100 that can be used to execute embodiments of this specification. In some examples, the example environment 100 enables entities to participate in a consortium blockchain network 102. The example environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link.

In the depicted example, the computing systems 106, 108 can each include any appropriate computing system that enables participation as a node in the consortium blockchain network 102. Example computing devices include, without limitation, a server, a desktop computer, a laptop computer, a tablet computing device, and a smartphone. In some examples, the computing systems 106, 108 hosts one or more computer-implemented services for interacting with the consortium blockchain network 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
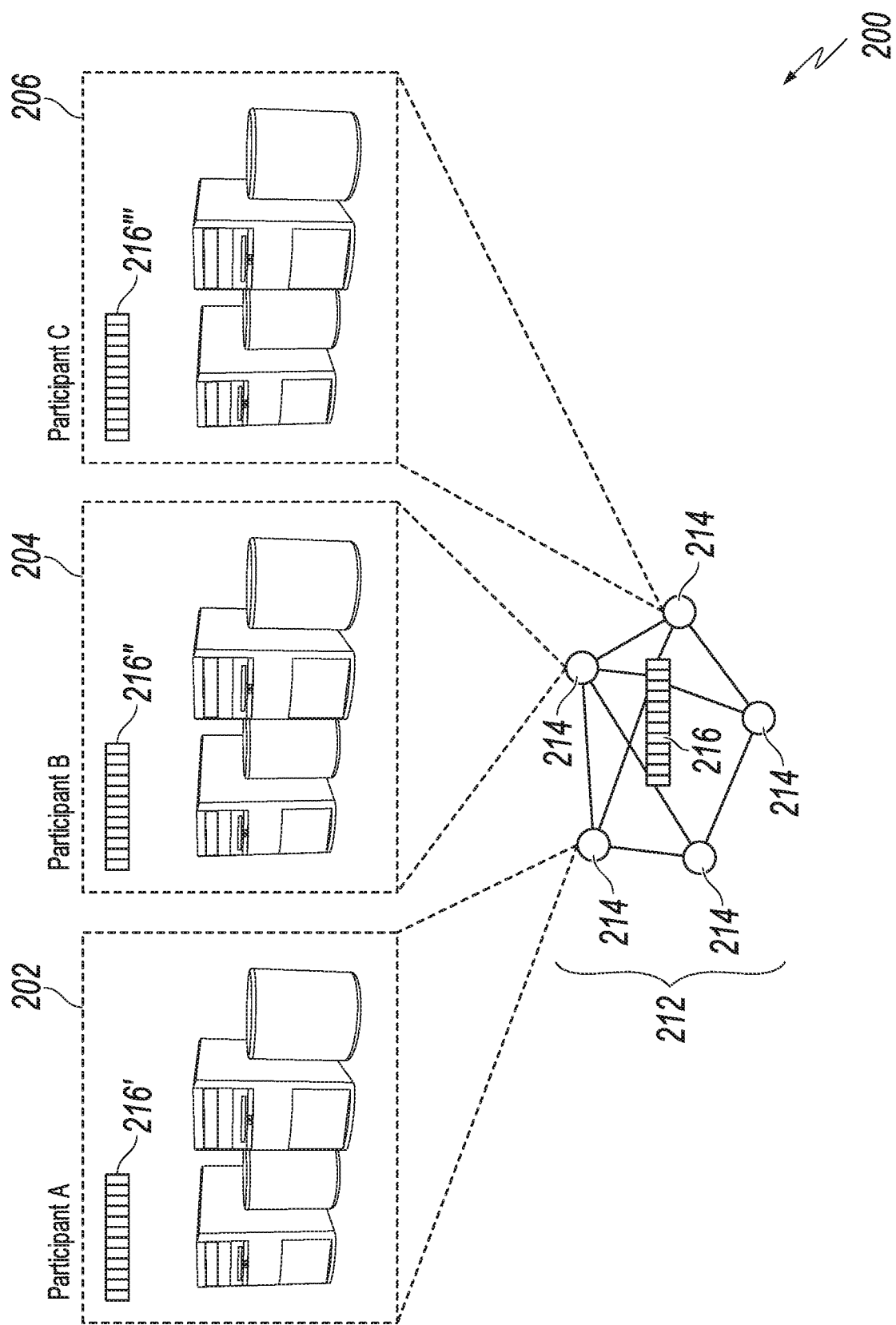
FIG. 2 is a diagram illustrating an example of an architecture in accordance with embodiments of this specification.

FIG. 2 depicts an example of a conceptual architecture 200 in accordance with embodiments of this specification. The conceptual architecture 200 includes an entity layer 202, a hosted services layer 204, and a blockchain network layer 206. In the depicted example, the entity layer 202 includes three participants, Participant A, Participant B, and Participant C, each participant having a respective transaction management system 208.

In the depicted example, the hosted services layer 204 includes interfaces 210 for each transaction management system 210. In some examples, a respective transaction management system 208 communicates with a respective interface 210 over a network (e.g., the network 110 of FIG. 1) using a protocol (e.g., hypertext transfer protocol secure (HTTPS)). In some examples, each interface 210 provides communication connection between a respective transaction management system 208, and the blockchain network layer 206. More particularly, the interface 210 communicate with a blockchain network 212 of the blockchain network layer 206. In some examples, communication between an interface 210, and the blockchain network layer 206 is conducted using remote procedure calls (RPCs). In some examples, the interfaces 210 "host" blockchain network nodes for the respective transaction management systems 208. For example, the interfaces 210 provide the application programming interface (API) for access to blockchain network 212.

As described herein, the blockchain network 212 is provided as a peer-to-peer network including a plurality of nodes 214 that immutably record information in a blockchain 216. Although a single blockchain 216 is schematically depicted, multiple copies of the blockchain 216 are provided, and are maintained across the blockchain network 212. For example, each node 214 stores a copy of the blockchain. In some embodiments, the blockchain 216 stores information associated with transactions that are performed between two or more entities participating in the consortium blockchain network.

A blockchain (e.g., the blockchain 216 of FIG. 2) is made up of a chain of blocks, each block storing data. Example data includes transaction data representative of a transaction between two or more participants. While transactions are used herein by way of non-limiting example, it is contemplated that any appropriate data can be stored in a blockchain (e.g., documents, images, videos, audio). Example transactions can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed. Transactions are added to the blockchain by consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

In some blockchain networks, cryptography is implemented to maintain privacy of transactions. For example, if two nodes want to keep a transaction private, such that other nodes in the blockchain network cannot discern details of the transaction, the nodes can encrypt the transaction data. Example cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

In some embodiments, nodes of the blockchain network, and/or nodes that communicate with the blockchain network can operate using TEEs. At a high-level, a TEE is a trusted environment within hardware (one or more processors, memory) that is isolated from the hardware's operating environment (e.g., operating system (OS), basic input/output system (BIOS)). In further detail, a TEE is a separate, secure area of a processor that ensures the confidentiality, and integrity of code executing, and data loaded within the main processor. Within a processor, the TEE runs in parallel with the OS. At least portions of so-called trusted applications (TAs) execute within the TEE, and have access to the processor and memory. Through the TEE, the TAs are protected from other applications running in the main OS. Further, the TEE cryptographically isolates TAs from one another inside the TEE.

An example of a TEE includes Software Guard Extensions (SGX) provided by Intel Corporation of Santa Clara, Calif., United States. Although SGX is discussed herein by way of example, it is contemplated that embodiments of this specification can be realized using any appropriate TEE.

SGX provides a hardware-based TEE. In SGX, the trusted hardware is the die of the central processing until (CPU), and a portion of physical memory is isolated to protect select code and data. The isolated portions of memory are referred to as enclaves. More particularly, an enclave is provided as an enclave page cache (EPC) in memory and is mapped to an application address space. The memory (e.g., DRAM) includes a preserved random memory (PRM) for SGX. The PRM is a continuous memory space in the lowest BIOS level and cannot be accessed by any software. Each EPC is a memory set (e.g., 4 KB) that is allocated by an OS to load application data and code in the PRM. EPC metadata (EPCM) is the entry address for respective EPCs and ensures that each EPC can only be shared by one enclave. That is, a single enclave can use multiple EPCs, while an EPC is dedicated to a single enclave.

During execution of a TA, the processor operates in a so-called enclave mode when accessing data stored in an enclave. Operation in the enclave mode enforces an extra hardware check to each memory access. In SGX, a TA is compiled to a trusted portion, and an untrusted portion. The trusted portion is inaccessible by, for example, OS, BIOS, privileged system code, virtual machine manager (VMM), system management mode (SMM), and the like. In operation, the TA runs and creates an enclave within the PRM of the memory. A trusted function executed by the trusted portion within the enclave is called by the untrusted portion, and code executing within the enclave sees the data as plaintext data (unencrypted), and external access to the data is denied. The trusted portion provides an encrypted response to the call, and the TA continues to execute.

An attestation process can be performed to verify that expected code (e.g., the trusted portion of the TA) is securely executing within an authenticated TEE. In general, the attestation process includes a TEE receiving an attestation request from a challenger (e.g., a key management system (KMS) of the blockchain network). In response, the TEE can produce a quote for performing a remote attestation. Performing the remote-attestation includes a local attestation being sent from the enclave to a so-called quoting enclave, which verifies the local-attestation, and converts the local-attestation into the remote-attestation by signing the local-attestation using an asymmetric attestation key. The quote is provided to the challenger (e.g., KMS of the blockchain network).

The challenger uses an attestation verification service to verify the remote-attestation. For SGX, Intel provides the Intel Attestation Service (IAS), which receives the remote-attestation from the challenger, and verifies the remote-attestation. More particularly, the IAS processes the remote-attestation, and provides a report (e.g., attestation verification report (AVR)), which indicates whether the remote-attestation is verified. If not verified, an error can be indicated. If verified (the expected code is securely executing in the TEE), the challenger can start, or continue interactions with the TEE. For example, in response to the verification, the KMS (as challenger) can issue asymmetric encryption keys (e.g., a public-key and private-key pair) to the node executing the TEE (e.g., through a key exchange process, such as elliptical curve Diffie-Hellman (ECDH)) to enable the node to securely communicate with other nodes, and/or clients.

A mutual attestation process involves a node executing a first TEE performing a remote attestation of a node executing a second TEE, after which the node executing the second TEE performs a remote attestation of the node executing the first TEE. Once both nodes have verified each other, the nodes can perform a key exchange process in order to enable secure communication between them.

In some blockchain networks, so-called smart contracts can be executed. Smart contracts can be described as digital representations of real-world, legal contracts having contractual terms affecting various parties. A smart contract is implemented, stored, updated (as needed), and executed within, in the example context, a consortium blockchain network. Contract parties associated with the smart contract (e.g., buyers and sellers) are represented as nodes in the consortium blockchain network. In some examples, the contract parties can include entities (e.g., business enterprises) that are associated with the smart contract (e.g., as parties to the smart contract).

In further detail, smart contracts are provided as computer-executable programs that execute on blockchains (e.g., a node within a blockchain network). A smart contract contains a set of pre-defined rules under which the parties to that smart contract agree to interact with each other. If the pre-defined rules of the smart contract are met, the agreement defined in the smart contract is automatically enforced. A smart contract is usually tamper resistant and facilitates, verifies, and enforces the negotiation or performance of an agreement or transaction.

Figure 3:
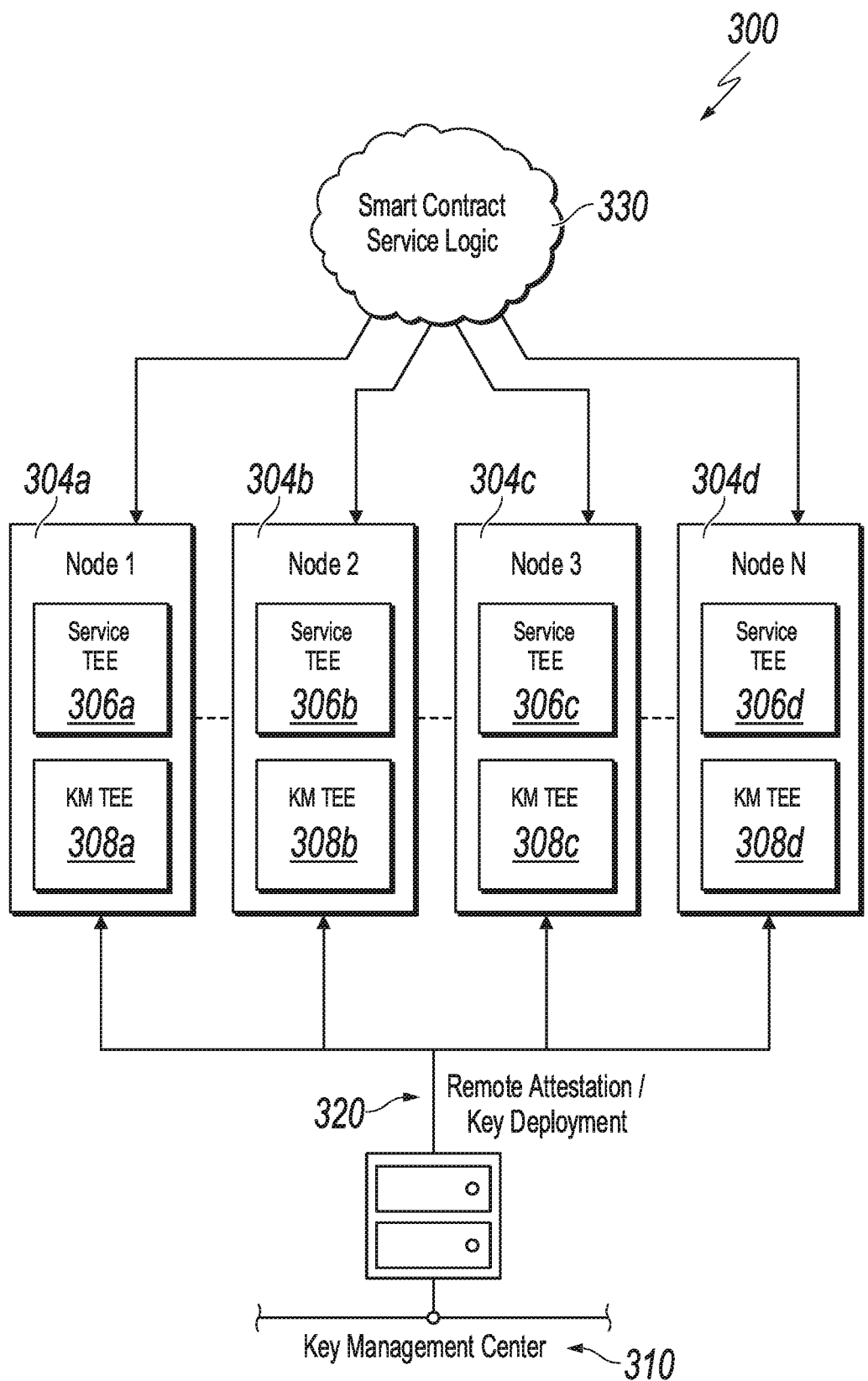
FIG. 3 is a diagram illustrating an example of a system in accordance with embodiments of this specification.

FIG. 3 is a diagram illustrating an example of a system 300 in accordance with embodiments of this specification. As shown, system 300 includes a blockchain network 302 including blockchain nodes 304*a-d*. The blockchain nodes 304*a-d* include service TEEs 306*a-d* and key management (KM) TEEs 308*a-d*. The nodes 304*a-d* have access to smart contract service logic 330. A key management center 310 is communicably coupled to the nodes 304*a-d*.

Each of the nodes 304*a-d* is blockchain node participating in the blockchain network 302 and contributing to the maintenance of a blockchain associated with the blockchain network 302 (not shown). As described above, the nodes 304*a-d* can participate in a consensus process associated with the blockchain network 302, can collect transactions into blocks for addition to the blockchain, can process transactions requested by users of the blockchain network 302, can execute operations encoded in smart contracts, and perform other tasks related to the management of the blockchain. In some embodiments, each node can be a computing device (e.g., a server) including one or more processors, storage devices, and other components. In some cases, the nodes 304*a-d* communicate over a communications network (not shown) to each other and to other nodes participating in the blockchain network 302. For the remainder of the description of FIG. 3, node 304*a* will be described as an example, with the understanding that nodes 304*b-d* can also include the features of node 304*a*.

Node 304*a* includes a service TEE 306*a*. In some embodiments, the service TEE 306*a* is a secure application environment implemented using a TEE technology (e.g., Intel SGX). One or more software programs or libraries can be executed by the service TEE 306*a*. For the purposes of the present specification, the service TEE 306*a* refers to the secure environment (the TEE) as well as software executing inside the TEE that performs the described operations. In some embodiments, the service TEE 306a executes smart contract operations specified by encrypted client requests and outputs encrypted results associated with the smart contract operations. This functionality is described in greater detail with respect to FIG. 4 below.

Node 304a also includes a key management TEE (KM TEE) 308a. In some embodiments, the KM TEE 308a is a secure application environment implemented using a TEE technology (e.g., Intel SGX). One or more software programs or libraries can be executed by the KM TEE 308a. For the purposes of the present specification, the KM TEE 308a refers to the secure environment (the TEE) as well as software executing inside the TEE that performs the described operations. In some embodiments, the KM TEE 308a obtains encryption keys from the key management center 310 as described in greater detail with respect to FIG. 4 below.

The key management center 310 can generate, store, and maintain encryption keys. The key management center 310 can also authenticate identities of KM TEEs 308a-d and provide the encryption keys to the nodes 304a-d through a remote attestation and key deployment process 320. In some embodiments, the key management can further provide encryption keys to clients for interacting with the nodes 304a-d. This functionality is described in greater detail with respect to FIG. 4 below. In some embodiments, the key management center 310 can be one or more servers or other computing devices in communication with one or more nodes of the blockchain network 302 over a communications network (not shown). The key management center 310 can also include one or more storage devices coupled to the key management center 310 or accessible over the communications network for storing the encryption keys and other data.

In some cases, the key management center 310 operates to authenticate the identities of the KM TEEs 308a-d before performing encryption key deployments. For example, prior to providing the one or more encryption keys (described below) to the KM TEE 308a, the key management center 310 can verify the authenticity of the KM TEE 308a. This verification ensures that the software executed by the KM TEE 308a has not been tampered with after being provisioned. In some embodiments, the verification can include a remote attestation process 320, such as those described above.

After the KM TEEs 308a-d obtain the one or more encryption keys from the key management center 310, the keys can be forwarded to service TEEs 306a-d to perform cryptographic operations. In some cases, although a KM TEE and service TEE pair (e.g., KM TEE 308a and service TEE 306a) operate on a single node (e.g., node 304a), they each have their own independent TEEs. As a result, information communicated between the KM TEEs 308a-d and service TEEs 306a-d is transmitted through untrusted area. In such cases, the KM TEEs 308a-d can authenticate the identities of the service TEEs 306a-d, for example by performing a local attestation process.

Local attestation can allow an enclave to prove its identity or authenticity to another enclave within the same local platform. For example, a KM TEE 308a can send a challenge to verify the authenticity of the service TEE 306a. Upon receiving the challenge, the service TEE 306a can request a hardware (e.g., CPU) of node 304a to generate a report, which includes cryptographic proof that the service TEE 306a exists on the node 304a. The report can be provided to the KM TEE 308a to verify that the enclave report was generated on the same platform by node 304a. In some cases, the local attestation can be performed based on a symmetric key system where only the KM TEE 308a verifying the report and the enclave hardware generating the report know the symmetric key, which is embedded in the hardware platform of node 304a.

After the service TEE 306a-d are authenticated through local attestations, the KM TEE 308a-d can provide the one or more encryption keys to the service TEEs 306a-d. In some cases, the KM TEE 308a-d can provide the encryption keys in response to the authentication of the service TEE 306a-d, or can provide the keys in response to one or more requests by the service TEE 306a-d.

Instead of trusting the key management center 310 as a central authority to deploy encryption keys, this specification further provides a decentralized key management scheme implemented by the KM TEEs 308a-d. The KM TEEs 308a-d can establish a trust relationship and reach consensus for providing encryption keys to respective service TEEs 306a-d.

At a high-level, the decentralized key management scheme can include a mutual attestation (MA) stage and a consensus stage. At the MA stage, each of the KM TEEs 308a-d can act both as attester and challenger to perform MAs with one or more of other KM TEEs in the blockchain network 302. The MAs can be performed based on a MA logic to establish a trust relationship among the KM TEEs in the blockchain network 302. The MA logic for establishing the trust relationship can have different logic structures. Two example MA logics are discussed in further details in the descriptions of FIGS. 7 and 8.

After a trust relationship is established among the KM TEEs 308a-d, the decentralized key management scheme can enter the consensus stage. At the consensus stage, the KM TEEs 308a-d can generate and share encryption keys with each other and reach consensus on which encryption keys to be deployed to the service TEEs 306a-d. The consensus can be reached based on performing a consensus process suitable for a consortium blockchain, such as the PBFT described earlier. The encryption key deployment can be performed based on authenticating the respective service TEEs 306a-d through local attestations.

In some embodiments, the KM TEEs 308a-d can collectively manage the key management center 310. In such cases, the encryption keys can still be generated by the key management center 310 and provided to KM TEEs 308a-d after successful remote attestations. However, which encryption keys to be deployed to which one of the KM TEEs 308a-d or the service TEEs 306a-d can be determined through a consensus process among the KM TEEs 304a-d.

In some embodiments, the KM TEEs 308a-d can elect, through a consensus process, one or more of the KM TEEs 308a-d to act as the key management center 310 to generate and maintain encryption keys, and deploy the encryption keys to trusted TEEs.

Figure 7:
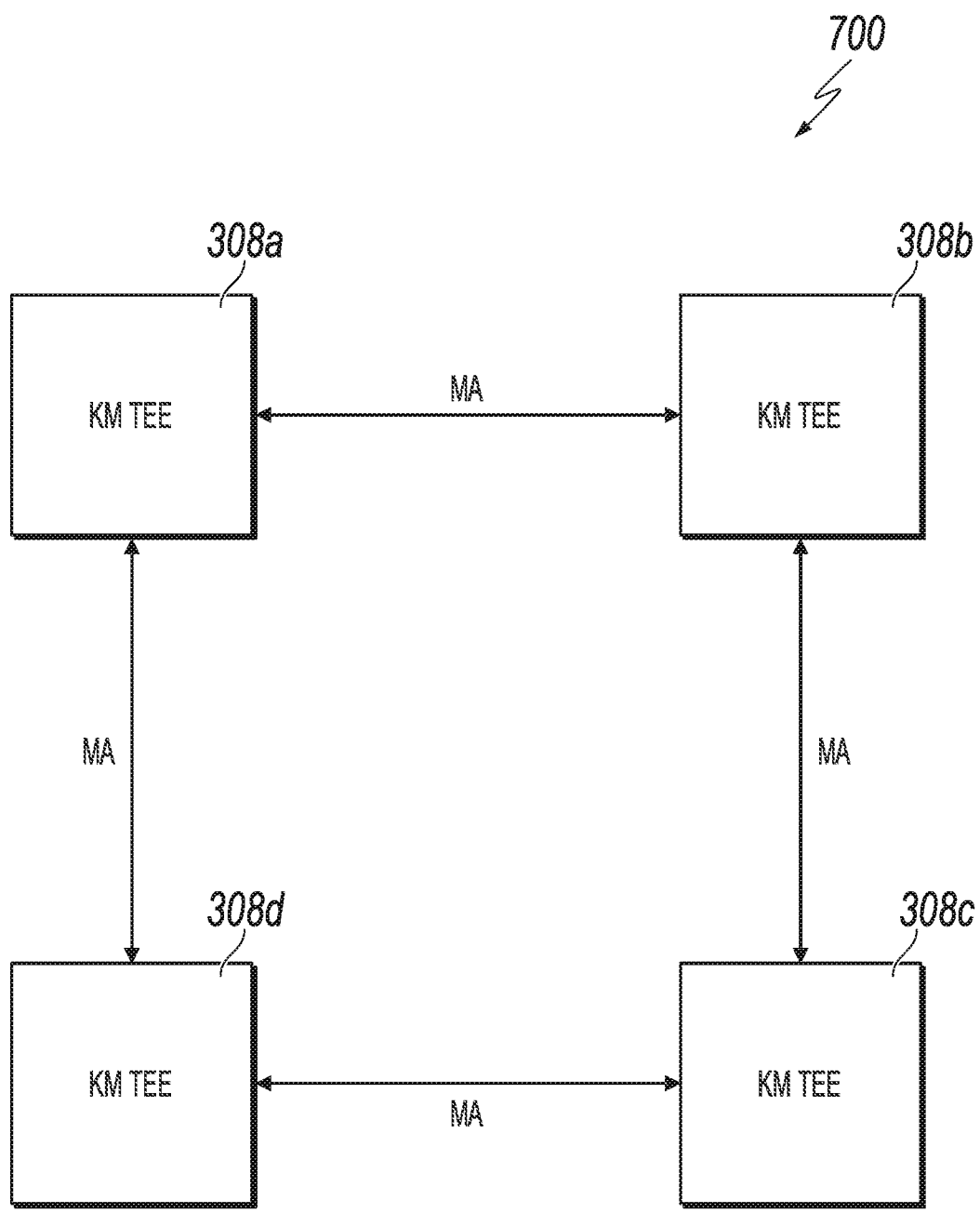
FIG. 7 is a diagram illustrating an example of a mutual attestation logic in accordance with embodiments of this specification.

Referring to FIG. 7, FIG. 7 is a diagram illustrating an example of an MA logic 700 in accordance with embodiments of this specification. As described earlier, at a high-level, a mutual attestation process involves a node executing a first TEE performing a remote attestation of a node executing a second TEE, after which the node executing the second TEE performs a remote attestation of the node executing the first TEE. Once both nodes have verified each other, the nodes can perform a key exchange process in order to enable secure communications between them.

Using a mutual attestation process between KM TEE 308a and KM TEE 308b for example, during the mutual attestation process, the KM TEE 308a first performs a remote attestation of the KM TEE 308b. During the remote attestation process, both the KM TEE 308a and the KM TEE 308b can derive a shared key using a key generation protocol such as a sigma protocol. The KM TEE 308a can then generate a nonce, calculate hash values of its own and the KM TEE 308b's SGX reports and then send them to the KM TEE 308b. The KM TEE 308b can then perform a remote attestation of the KM TEE 308a and verify the signatures of hashed reports. If the verification is successful, the KM TEE 308b can be confirmed to be communicating with the correct KM TEE 308a. The KM TEE 308b then generates a session key and sends both the nonce and the session key back to the KM TEE 308a.

The KM TEE 308a can then perform a match of the received nonce with the one originally sent. If they match, the KM TEE 308a can be confirmed to be communicating with the correct KM TEE 308b. As such, an MA is successfully performed. The KM TEE 308a can then securely communicate with KM TEE 308b by using the session key for data encryption. The MA between other KM TEEs can be similarly performed.

Under the MA logic 700, any one of the KM TEEs 308a-d performs MAs with two other KM TEEs 308a-d to form a closed-looped authentication "ring". In some cases, a KM TEE can select the two KM TEEs that are in close geographic proximity or have high communication efficiency to perform the MAs, so long as the overall MAs of the KM TEEs 308a-d are performed in a closed-loop.

In the example illustrated in FIG. 7, the KM TEE 308a performs both the challenger and the attester in an MA with KM TEE 308b, the KM TEE 308b performs both the challenger and the attester in an MA with KM TEE 308c, the KM TEE 308c performs both the challenger and the attester in an MA with KM TEE 308d, and the KM TEE 308d performs both the challenger and the attester in an MA with KM TEE 308a. Since the MAs are performed to form a closed-loop that involves all the KM TEEs 308a-d, the identity of each KM TEE is successively authenticated and a trust relationship is formed among the KM TEEs 308a-d.

Figure 8:
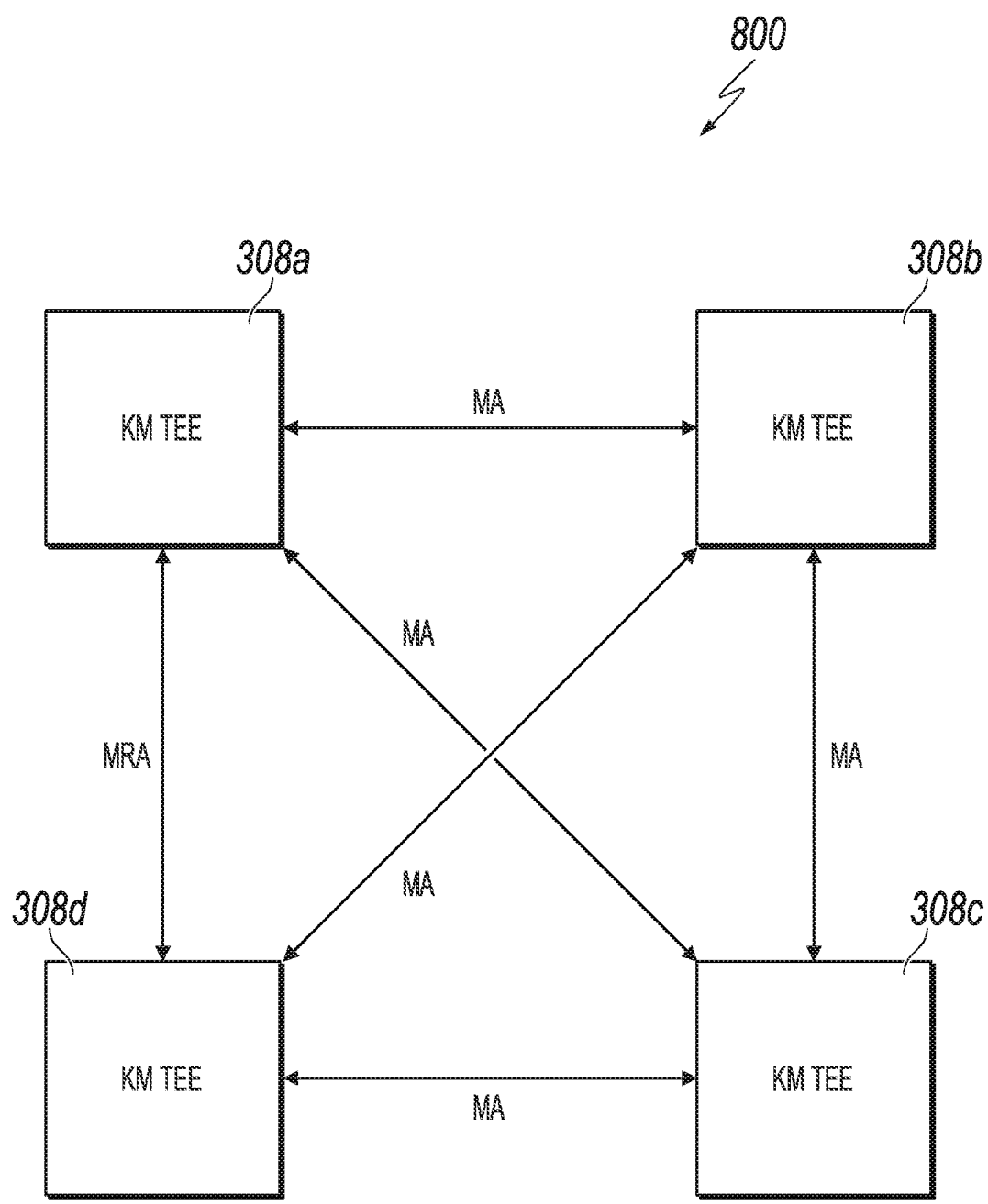
FIG. 8 is a diagram illustrating an example of another mutual attestation logic in accordance with embodiments of this specification.

FIG. 8 is a diagram illustrating an example of another MA logic 800 in accordance with embodiments of this specification. In the example of MA logic 800, the MAs are performed in a round-robin manner. In other words, each KM TEE performs an MA once with each of the other KM TEEs in the blockchain network. For example, in addition to performing the MAs under the MA logic 700 as discussed in the description of FIG. 7, the KM TEE 308a performs both the challenger and the attester in an MA with KM TEE 308c, and the KM TEE 308b performs both the challenger and the attester in an MA with KM TEE 308d.

Since the identities of any two of the KM TEEs in the blockchain network are mutually authenticated, the MA logic 800 can be more secure than the MA logic 700. On the other hand, since less MAs are performed under MA logic 700, the MA logic 700 can be more efficient in terms of authentication speed and resource consumption. The MA logic 800 can be more suitable for blockchain networks with a smaller number of consensus nodes or higher security requirement. The MA logic 700 can be more suitable for blockchain networks with a larger number of consensus nodes or lower security requirement.

Figure 4:
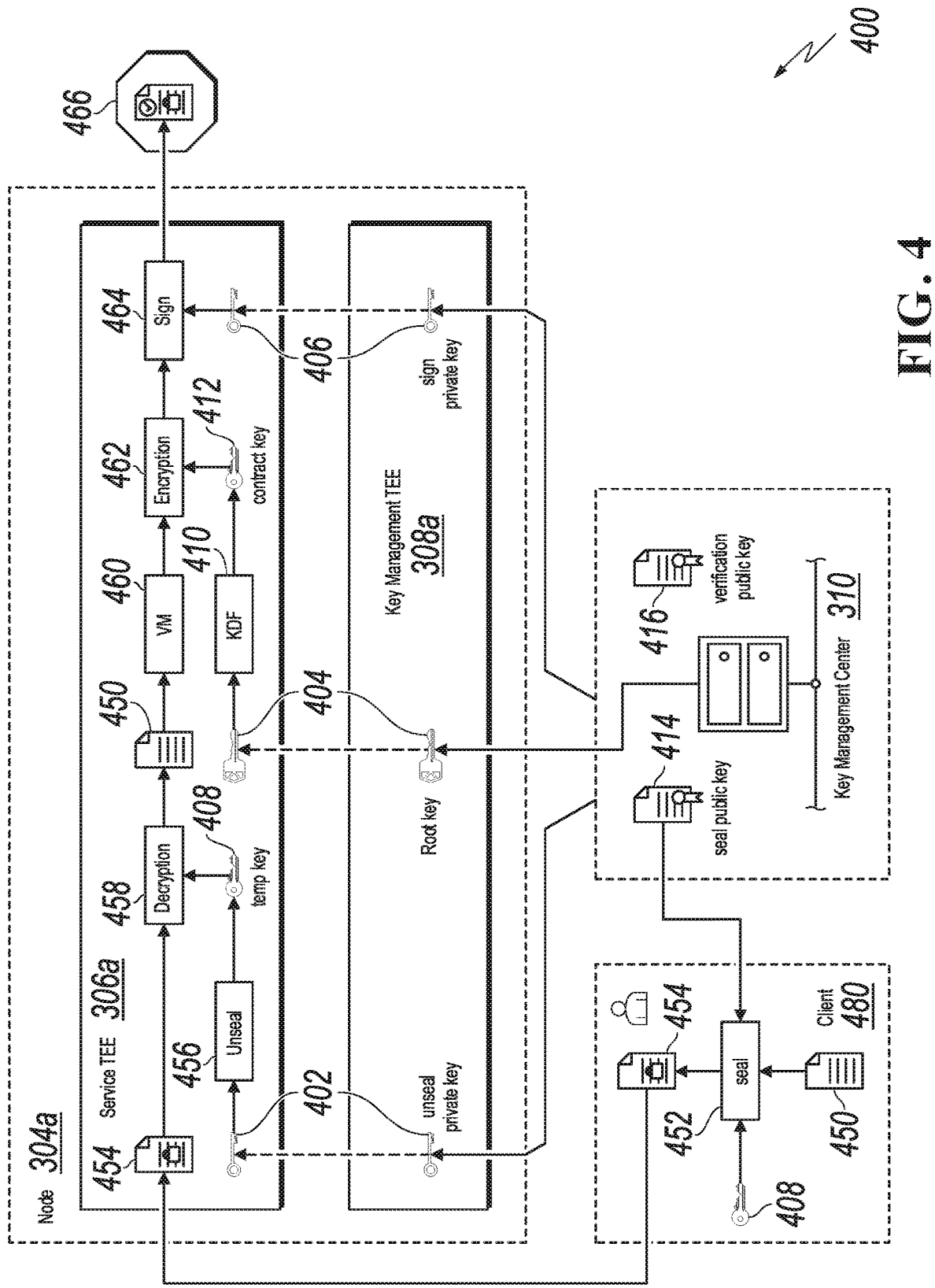
FIG. 4 is a diagram illustrating an example of a system in accordance with embodiments of this specification.

Referring back to FIG. 3, the smart contract service logic 330 includes smart contract definitions. Nodes 304a-304d execute particular operations from the smart contract service logic 330 (e.g., upon request of a client, as shown in FIG. 4). In some embodiments, the smart contract definitions in the smart contract service logic 330 include instructions to executed by nodes of the blockchain network 302. The smart contract service logic 330 can include the smart contract definitions stored in one or more blockchains maintained by the blockchain network 302 (not shown).

FIG. 4 is a diagram illustrating an example of a system 400 in accordance with embodiments of this specification. As shown, the system 400 includes the node 304a (including the service TEE 306a and the KM TEE 308a), and the key management center 310 described with respect to FIG. 3. The system 400 also includes a client 480 communicatively coupled to the key management center 310.

In operation, the system 400 can securely execute smart contract instructions and produce encrypted results of the operation (e.g., for inclusion in a blockchain). As discussed above, the key management center 310 can perform remote attestation to authenticate identity of the KM TEE 308a before trusting it with the encryption keys. After the KM TEE 308 is authenticated, the key management center 310 can provide an unseal private key 402, a root key 404 and a sign private key 406 to the KM TEE 308a of the Node 304a. The key management center 310 also hosts a seal public key 414 and a verification public key 416. The key management center 310 provides these keys to authorized clients to perform encryption and decryption of various data associated with the service TEE 306a, as described below.

As shown, the key management center 310 provides the seal public key 414 to the client 480. In some cases, the key management center 310 authenticates the client 480 and only provides the seal public key 414 if the client 480 is authorized to access it. The key management center 310 can consult an internal or external permissions resource to make this determination. The seal public key 414 is associated with an unseal private key 402 provided to the KM TEE 308a. The seal public key 414 and the unseal private key 402 form a key pair, meaning that data encrypted with the seal public key 414 can be decrypted using the unseal private key 402.

The client 480 identifies a requested contract operation 450, which is a smart contract operation to be executed by an Ethereum virtual machine (VM) 460 deployed in the service TEE 306a. In some cases, the smart contract operations 450 include one or more instructions encoded in a smart contract programming language for execution by a VM operable to execute instruction in that language. The smart contract operations 450 can include an execution state for the smart contract associated with the request contract operation 450. During execution of a smart contract, multiple nodes of a blockchain network execute each instruction of the smart contract individually, and produce a result indicating an execution state of the smart contract after the completion of the instruction. The execution state can include data associated with the smart contract. Each executed instruction of the contract can change the contents of the data (e.g., to store a value to be used by a later instruction in the smart contract). After execution of an instruction of the smart contract, the nodes of the blockchain network reach a consensus on the new execution state after execution of the instruction. This consensus process is performed for each instruction executed in a smart contract, leading to a consensus as to the execution path of the smart contract and, ultimately, as to the final result of the execution.

At 452, the client 480 encodes (or seals) the requested contract operation 450 in a digital envelope 454 for transmission to the service TEE 306a executed by the Node 304a. For example, the client 480 generates a temporary symmetric key 408 and encrypts the requested contract operation 450 using the key 408. The client 480 then encrypts the temporary symmetric key 408 using the seal public key 414, and concatenates the encrypted contract operation 450 and the encrypted key 408 to produce the digital envelope 454.

The client 480 transmits the digital envelope 454 to the node 304a, where it is provided to the service TEE 306a. In some cases, the client 480 can send the digital envelope 454 to multiple nodes 304a-d to request processing of the requested contract operation 450. In some cases, the client 480 can send digital envelopes created using seal public keys specific to the particular nodes. The client 480 can also broadcast the digital envelope 454 to the nodes 304a-d in cases where the same seal public key 414 and unseal private key 402 are associated with all the nodes 304a-d.

The service TEE 306a receives the digital envelope 454 from the client 480 and recovers the requested contract operation 450 from the digital envelope 454. As shown, the service TEE 306a decodes the digital envelope 454 using the unseal private key 402 obtained from the KM TEE 308a. In some cases, the service TEE 306a decrypts (unseals) the temporary symmetric key 408 using the unseal private key 402 (at 456), and then decrypts the requested contract operation 450 using the temporary symmetric key 408 (at 458).

The service TEE 306a then executes the requested contract operation 450 using a VM 460 deployed in the service TEE 306a. In some embodiments, the VM 460 can be a VM configured to execute instructions of a smart contract programming language, such as an Ethereum VM, or other type of VM. In some cases, the VM 460 can access resources external the service TEE 306a during execution of the operation 450, such as, for example, external servers, a blockchain, a database, or other resources indicated by the operation 450. In some embodiments, accessing external resources can be restricted or denied, such that the entirety of the execution of the operation depends only on data stored in the service TEE 306a (such as the smart contract state). This type of restriction can further reduce the possibility of tampering with the execution of the operation 450.

The execution of the operation 450 by the VM 460 can produce one or more results. In some cases, the results can include an execution state of the smart contract after executing the operation 450, as described above. At 462, the result of the smart contract operation 450 is encrypted by the service TEE 306a using a contract key 412. The contract key 412 is derived (at 410) from a root key 404 based on a key derivation function (KDF). In some examples, the KDF can be performed based on iterative hash algorithms, such as HMAC-based extract-and-expand key derivation function (HKDF) or pseudo-random function (PRF). The contract key can be provided by the KM TEE 308a to the service TEE 306a. In some embodiments, the root key 404 can be a symmetric encryption key associated with the node 304a. The root key 404 can also include one or more subkeys that can be derived from the root key 404. The contract key 412 can be one of these subkeys. In some cases, the root key 404 itself can be used to encrypt the result at 462.

After encrypting the result, the service TEE 308a, at 464, signs the encrypted result using a sign private key 406 provided by the KM TEE 308a to the service TEE 306a, so as to produce a signed result 466. This can allow later verification of the signed result by a third party (for example, a client), using the verification public key 416 (correspondingly paired to the sign private key 406) maintained by the key management center 310. In some cases, signing the encrypted result by the sign private key 406 can include encrypting the encrypted result together with the contract key 412 used to encrypt the result. In such a case, a third party holding the verification public key 416 can decrypt the the contract key 412 first, and further use the contract key 412 to decrypt the result.

In some cases, the service TEE 306a can store the signed result 466 in a blockchain. As described above, a third party holding the verification public key 416 can use the key to decrypt the result 466 in order to inspect. For example, the client 480 can retrieve the verification public key 416 from the key management center 310 (e.g., subject to authentication as previously described), and can access and decrypt the signed result 466 using the verification public key 416. The client 480 can then request that the next operation in the smart contract be executed by the service TEE 306a, an can include the requested next operation and the execution state of the smart contract (from the decrypted signed result 466) in the digital envelope sent to the service TEE 306a.

Figure 5:
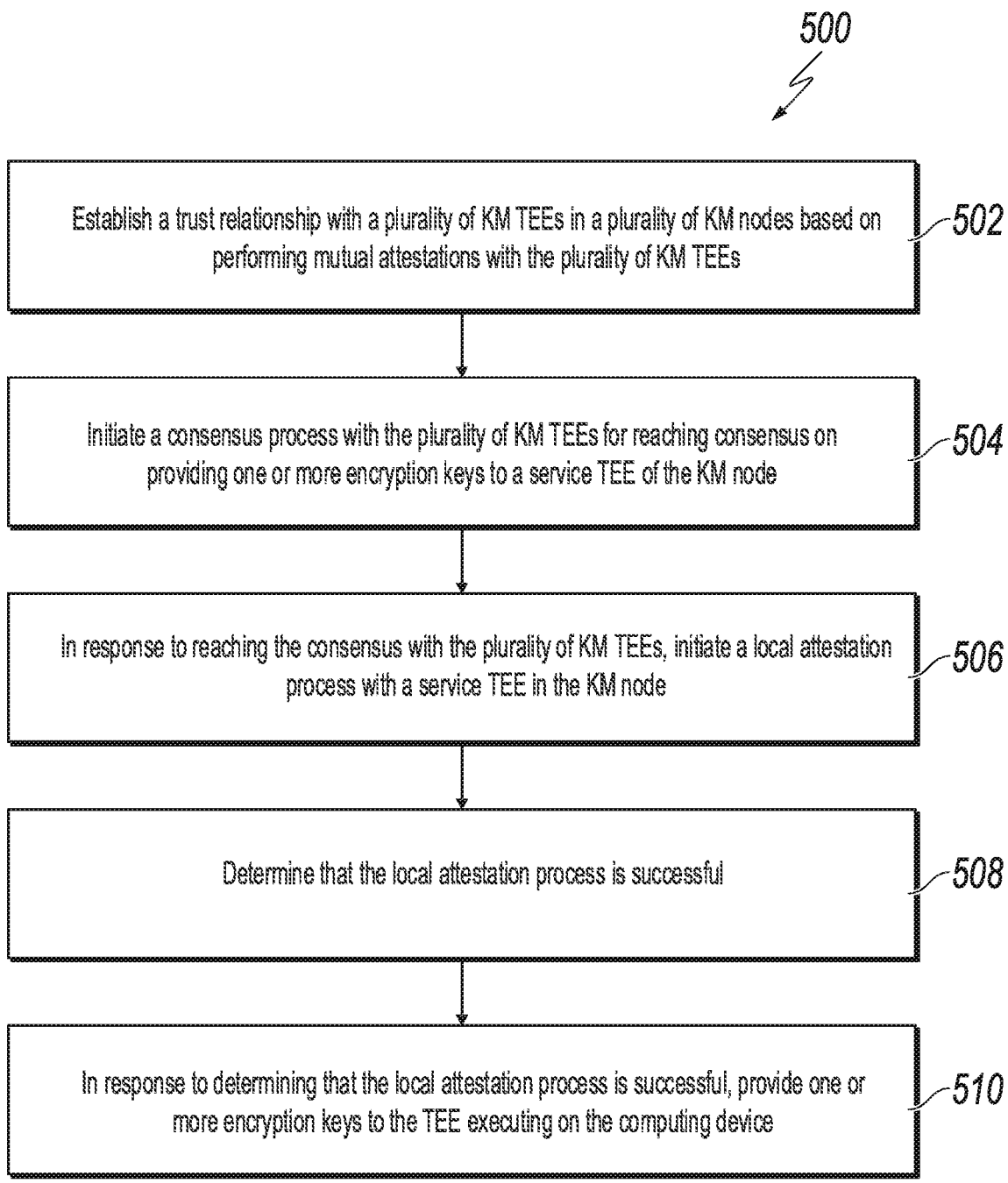
FIG. 5 depicts an example of a process that can be executed in accordance with embodiments of this specification.

FIG. 5 depicts an example of a process that can be executed in accordance with embodiments of this specification. At 502, a blockchain node (e.g., 304a) participating in a blockchain network (e.g., 302) establishes a trust relationship with a plurality of KM TEEs in a plurality of KM nodes based on performing mutual attestations with the plurality of KM TEEs, wherein the KM node and the plurality of KM nodes are in a consortium blockchain.

At 504, the blockchain node initiates a consensus process with the plurality of KM TEEs for reaching consensus on providing one or more encryption keys to a service TEE of the KM node.

At 506, the blockchain node initiates a local attestation process with a service TEE in the KM node.

At 508, the blockchain node determines that the local attestation process is successful.

At 510, the blockchain node provides one or more encryption keys to the TEE executing on the computing device.

In some cases, the blockchain node stores the encryption keys in the consortium blockchain, wherein the encryption keys stored in the consortium blockchain represent a consensus version of the encryption keys accessible by all nodes in the consortium blockchain.

In some cases, the KM TEE is a first KM TEE, and establishing the trust relationship includes the first KM TEE performing a mutual attestation process with a second KM TEE and a third TEE in the plurality of KM TEEs.

In some cases, the KM TEE and the plurality of KM TEE form a set of KM TEE of the consortium blockchain, and wherein establishing the trust relationship further includes any each of the plurality of KM TEEs performing a mutual attestation process with two of the set of the KM TEEs.

In some cases, establishing the trust relationship further includes the KM TEE performing a mutual attestation with each of the plurality of KM TEE.

In some cases, the encryption keys is stored in the consortium blockchain in response to the KM TEE and the plurality of KM TEEs successfully performing a consensus process on the encryption keys.

In some cases, the consensus process is a Practical Byzantine Fault Tolerance (PBFT) process.

In some cases, the KM TEE is a first KM TEE, the encryption keys include a TEE public key and a TEE private key associated with the service TEE, and the first KM TEE or a second KM TEE retrieves the TEE public key from the consortium blockchain and provides the TEE public key to a client in response to a request.

Figure 6:
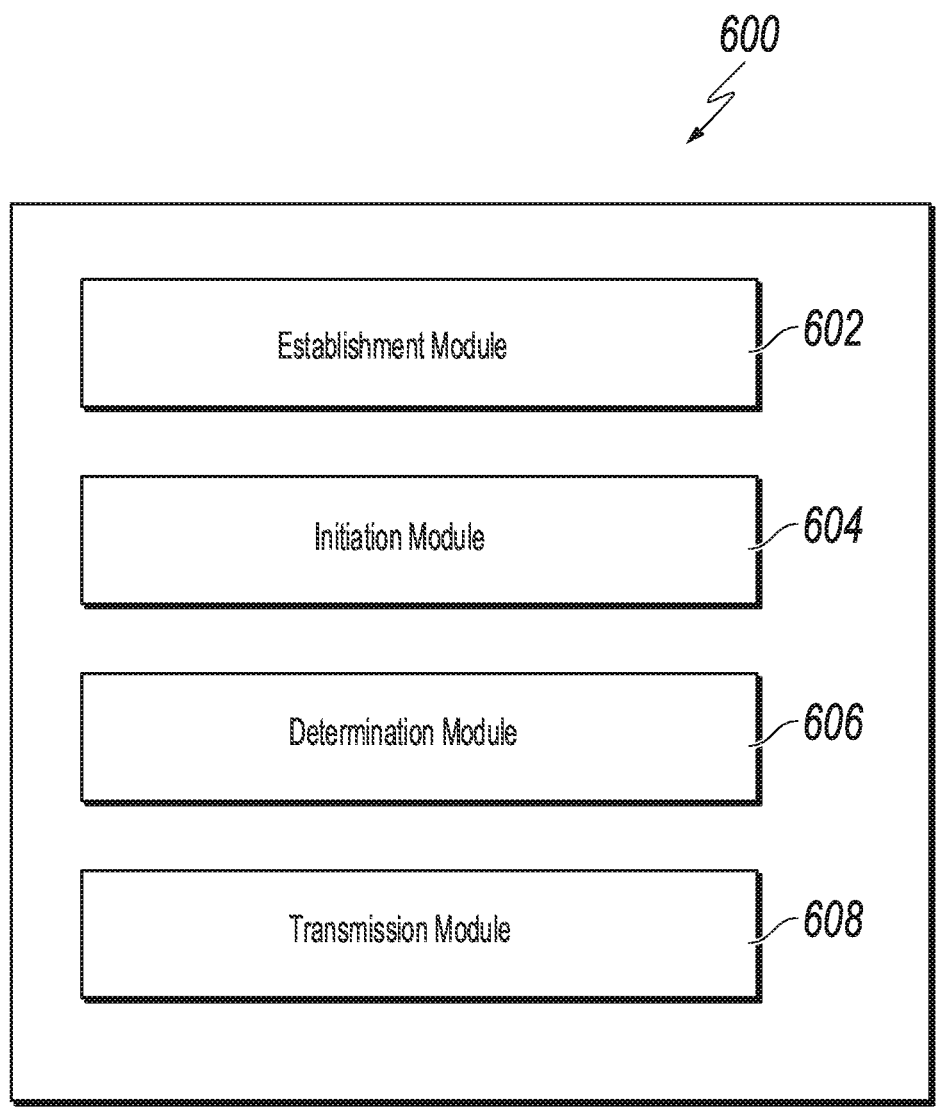
FIG. 6 depicts examples of modules of an apparatus in accordance with embodiments of this specification.

FIG. 6 depicts examples of modules of an apparatus 600 in accordance with embodiments of this specification. The apparatus 600 can be an example embodiment of a blockchain node executing within a blockchain network. The apparatus 600 can correspond to the embodiments described above, and the apparatus 600 includes the following: an establishment module 602 that establishes a trust relationship with a plurality of KM TEEs in a plurality of KM nodes based on performing mutual attestations with the plurality of KM TEEs, wherein the KM node and the plurality of KM nodes are in a consortium blockchain. An initiation module 604 that initiates a consensus process with the plurality of KM TEEs for reaching consensus on providing one or more encryption keys to a service TEE of the KM node and initiates a local attestation process with a service TEE in the KM node. A determination module 606 that determines that the local attestation process is successful; and a transmission module 608 that provides one or more encryption keys to the TEE executing on the computing device.

The system, apparatus, module, or unit illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIG. 6, it can be interpreted as illustrating an internal functional module and a structure of a blockchain node executing within a blockchain network and functioning as an execution body. An execution body in essence can be an electronic device, and the electronic device includes the following: one or more processors; and a memory configured to store an executable instruction of the one or more processors.

The techniques described in this specification produce one or more technical effects. In some embodiments, the described techniques enable multiple nodes to function as a distributed key management center (KMC) in order to authorize and configure trusted execution environments on other computing devices with encryption keys. In some cases, the keys are stored in a blockchain, allowing any of the multiple nodes to service requests for encryption keys received from other computing devices, even if the requested keys were configured and stored by a different node from the node receiving the request. In some examples, the techniques also provide additional operating resiliency against system outages, as the failure of one of the multiple nodes will not cause an interruption in the key management service (unlike a centralized solution). In some embodiments, the techniques can provide increased security, as an attacker would have to take control of all the key management nodes in order to compromise the system, due to the consensus processes associated with storing the encryption keys in the blockchain.

Described embodiments of the subject matter can include one or more features, alone or in combination. One embodiment includes a computer-implemented method comprising the actions of receiving, by a blockchain node participating in a blockchain network, an encrypted request to execute a smart contract operation from a client; decrypting, by the blockchain node in a TEE hosted by the blockchain node, the encrypted request with a first private key associated with the TEE to produce a requested smart contract operation, wherein the first private key corresponds to a public key associated with the TEE that was used to encrypt the encrypted request; executing, by the blockchain node in the TEE, the requested smart contract operation to produce a smart contract result; encrypting, by the blockchain node in the TEE, the smart contract result with a symmetric key associated with the TEE to produce an encrypted result; signing, by the blockchain node in the TEE, the encrypted result using a second private key associated with the TEE to produce a signed encrypted result, wherein the second private key is different than the first private key; and storing, by the blockchain node, the signed encrypted result in a blockchain maintained by the blockchain network.

The foregoing and other described embodiments can each, optionally, include one or more of the following features:

A first feature, combinable with any of the following features, specifies that the blockchain node stores the encryption keys in the consortium blockchain, wherein the encryption keys stored in the consortium blockchain represent a consensus version of the encryption keys accessible by all nodes in the consortium blockchain.

A second feature, combinable with any of the previous or following features, specifies that the KM TEE is a first KM TEE, and establishing the trust relationship includes the first KM TEE performing a mutual attestation process with a second KM TEE and a third TEE in the plurality of KM TEEs.

A third feature, combinable with any of the previous or following features, includes that the KM TEE and the plurality of KM TEE form a set of KM TEE of the consortium blockchain, and wherein establishing the trust relationship further includes any each of the plurality of KM TEEs performing a mutual attestation process with two of the set of the KM TEEs.

A fourth feature, combinable with any of the previous or following features, specifies that establishing the trust relationship further includes the KM TEE performing a mutual attestation with each of the plurality of KM TEE.

A fifth feature, combinable with any of the previous or following features, specifies that the encryption keys is stored in the consortium blockchain in response to the KM TEE and the plurality of KM TEEs successfully performing a consensus process on the encryption keys.

A sixth feature, combinable with any of the previous or following features, specifies that the consensus process is a Practical Byzantine Fault Tolerance (PBFT) process.

A seventh feature, combinable with any of the previous or following features, specifies that the KM TEE is a first KM TEE, the encryption keys include a TEE public key and a TEE private key associated with the service TEE, and the first KM TEE or a second KM TEE retrieves the TEE public key from the consortium blockchain and provides the TEE public key to a client in response to a request.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for verifying authenticity of trusted execution environments (TEEs), the method comprising:
   determining, by a key management center, that a trust relationship has been established among multiple knowledge management (KM) trusted execution environments (TEEs) based on a successful completion of a mutual attestation process by the KM TEEs;
   after determining that the trust relationship has been established among the multiple KM TEEs, determining, by the key management center, that the KM TEEs have reached a consensus based on a successful completion of a consensus process by the KM TEEs;
   after determining that the KM TEEs have reached the consensus, determining, by the key management center, to transmit one or more encryption keys that are specified by the consensus to a particular service TEE based on a successful completion of a local attestation process by a particular KM TEE that is implemented on a same blockchain node as the particular service TEE; and
   after determining to transmit the one or more encryption keys that are specified by the consensus to the particular service TEE, transmitting, by the key management center, the one or more encryption keys that are specified by the consensus to the particular service TEE that is implemented on the same blockchain node as the particular KM TEE.

2. The computer-implemented method of claim 1, wherein the KM TEEs are in a consortium blockchain and the method further comprises:
   storing the one or more encryption keys in the consortium blockchain, wherein the one or more encryption keys stored in the consortium blockchain represent a consensus version of the one or more encryption keys accessible by all nodes in the consortium blockchain.

3. The computer-implemented method of claim 1, wherein the key management center is comprised of one or more of the KM TEEs elected by the KM TEEs, through a different consensus process, to act as the key management center to generate and maintain encryption keys and deploy the encryption keys.

4. The computer-implemented method of claim 1, wherein the KM TEEs form a set of KM TEEs within a consortium blockchain, and wherein determining that the trust relationship has been established further includes determining that a second mutual attestation process between two KM TEEs of the set of KM TEEs is successful.

5. The computer-implemented method of claim 1, wherein determining that the trust relationship has been established further includes determining that a first KM TEE performs a mutual attestation with each of the KM TEEs.

6. The computer-implemented method of claim 1, wherein the KM TEEs are in a consortium blockchain, and wherein the encryption keys are stored in the consortium blockchain in response to the key management center determining the KM TEEs successfully performed the consensus process on the encryption keys.

7. The computer-implemented method of claim 1, wherein the consensus process is a Practical Byzantine Fault Tolerance (PBFT) process.

8. The computer-implemented method of claim 1, wherein the KM TEEs are in a consortium blockchain, and wherein the encryption keys include a TEE public key and a TEE private key associated with the particular service TEE, and wherein a first KM TEE or a second KM TEE retrieves the TEE public key from the consortium blockchain and provides the TEE public key to a client in response to a request.

9. A non-transitory, computer-readable medium storing one or more instructions executable by a computer system to perform operations comprising:
   determining, by a key management center, that a trust relationship has been established among multiple knowledge management (KM) trusted execution environments (TEEs) based on a successful completion of a mutual attestation process by the KM TEEs;

after determining that the trust relationship has been established among the multiple KM TEEs, determining, by the key management center, that the KM TEEs have reached a consensus based on a successful completion of a consensus process by the KM TEEs;

after determining that the KM TEEs have reached the consensus, determining, by the key management center, to transmit one or more encryption keys that are specified by the consensus to a particular service TEE based on a successful completion of a local attestation process by a particular KM TEE that is implemented on a same blockchain node as the particular service TEE; and after determining to transmit the one or more encryption keys that are specified by the consensus to the particular service TEE, transmitting, by the key management center, the one or more encryption keys that are specified by the consensus to the particular service TEE that is implemented on the same blockchain node as the particular KM TEE.

10. The non-transitory, computer-readable medium of claim 9, wherein the KM TEEs are in a consortium blockchain and the operations further comprise:
storing the one or more encryption keys in the consortium blockchain, wherein the one or more encryption keys stored in the consortium blockchain represent a consensus version of the one or more encryption keys accessible by all nodes in the consortium blockchain.

11. The non-transitory, computer-readable medium of claim 9, wherein the key management center is comprised of one or more of the KM TEEs elected by the KM TEEs, through a consensus process, to act as the key management center to generate and maintain encryption keys and deploy the encryption keys.

12. The non-transitory, computer-readable medium of claim 9, wherein the KM TEEs form a set of KM TEEs within a consortium blockchain, and wherein determining that a trust relationship has been established further includes determining that a mutual attestation process between two KM TEEs of the set of KM TEEs is successful.

13. The non-transitory, computer-readable medium of claim 9, wherein determining that the trust relationship has been established further includes determining that a first KM TEE performs a mutual attestation with each of the KM TEEs.

14. The non-transitory, computer-readable medium of claim 9, wherein the KM TEEs are in a consortium blockchain, and wherein the encryption keys are stored in the consortium blockchain in response to the key management center determining the KM TEEs successfully performed a consensus process on the encryption keys.

15. The non-transitory, computer-readable medium of claim 9, wherein the KM TEEs are in a consortium blockchain, and wherein the encryption keys include a TEE public key and a TEE private key associated with the particular service TEE, and wherein a first KM TEE or a second KM TEE retrieves the TEE public key from the consortium blockchain and provides the TEE public key to a client in response to a request.

16. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

determining, by a key management center, that a trust relationship has been established among multiple knowledge management (KM) trusted execution environments (TEEs) based on a successful completion of a mutual attestation process by the KM TEEs;

after determining that the trust relationship has been established among the multiple KM TEEs, determining, by the key management center, that the KM TEEs have reached a consensus based on a successful completion of a consensus process by the KM TEEs;

after determining that the KM TEEs have reached the consensus, determining, by the key management center, to transmit one or more encryption keys that are specified by the consensus to a particular service TEE based on a successful completion of a local attestation process by a particular KM TEE that is implemented on a same blockchain node as the particular service TEE; and after determining to transmit the one or more encryption keys that are specified by the consensus to the particular service TEE, transmitting, by the key management center, the one or more encryption keys that are specified by the consensus to the particular service TEE that is implemented on the same blockchain node as the particular KM TEE.

17. The computer-implemented system of claim 16, wherein the KM TEEs are in a consortium blockchain and the operations further comprise:
storing the one or more encryption keys in the consortium blockchain, wherein the one or more encryption keys stored in the consortium blockchain represent a consensus version of the one or more encryption keys accessible by all nodes in the consortium blockchain.

18. The computer-implemented system of claim 16, wherein the key management center is comprised of one or more of the KM TEEs elected by the KM TEEs, through a consensus process, to act as the key management center to generate and maintain encryption keys and deploy the encryption keys.

19. The computer-implemented system of claim 16, wherein the KM TEEs form a set of KM TEEs within a consortium blockchain, and wherein determining that a trust relationship has been established further includes determining that a mutual attestation process between two KM TEEs of the set of KM TEEs is successful.

20. The computer-implemented system of claim 16, wherein determining that the trust relationship has been established further includes determining that a first KM TEE performs a mutual attestation with each of the KM TEEs.

* * * * *